United States Patent [19]

Crossley et al.

[11] E Re. 30,319

[45] Reissued Jul. 1, 1980

[54] TABLETTING MACHINES

[75] Inventors: Jack Crossley; David H. Wilson, both of Liverpool, England

[73] Assignee: Manesty Machines, Ltd., Liverpool, England

[21] Appl. No.: 960,299

[22] Filed: Nov. 13, 1978

Related U.S. Patent Documents

Reissue of:

[64] Patent No.: 3,918,873
Issued: Nov. 11, 1975
Appl. No.: 523,143
Filed: Nov. 12, 1974

[30] Foreign Application Priority Data

Nov. 17, 1973 [GB] United Kingdom ..... 53494/73

[51] Int. Cl.[2] ..... B30B 11/08

[52] U.S. Cl. ..... 425/345; 425/353; 425/259; 425/261

[58] Field of Search ..... 425/344, 345, 352, 353, 425/354, 415, 259, 261

[56] References Cited

U.S. PATENT DOCUMENTS

| | | | |
|---|---|---|---|
| 3,016,572 | 1/1962 | Stott | 425/345 X |
| 3,063,390 | 11/1962 | Frank | 425/345 X |
| 3,158,111 | 11/1964 | Raff | 425/345 X |
| 3,276,079 | 10/1966 | Cohn | 425/345 |
| 3,337,915 | 8/1967 | Alexander | 425/345 X |

FOREIGN PATENT DOCUMENTS 48-748 11/1973 Japan .

*Primary Examiner*—J. Howard Flint, Jr.
*Attorney, Agent, or Firm*—Frishauf, Holtz, Goodman & Woodward

[57] ABSTRACT

A tabletting machine having continuous cam tracks to operate the punches, and including means for "in motion" adjustment of one of the cam tracks to control the dose of powdered material which is compressed by the punches in the dies to form the tablets and also the thickness of the tablets so produced. To assist in feeding the powdered material into the dies, a concave cylindrical die table is used, the punches operating radially with respect to the axis of rotation of the die table.

19 Claims, 3 Drawing Figures

TABLETTING MACHINES

Matter enclosed in heavy brackets [ ] appears in the original patent but forms no part of this reissue specification; matter printed in italics indicates the additions made by reissue.

This invention relates to tabletting machines and concerns a tabletting machine of the kind (hereinafter referred to as "a tabletting machine of the kind described") in which the powdered or granulated material to be tabletted is fed from a feed frame onto the surface of a rotating die table so as to fill dies in the die table and be compressed into a tablet in each die, between a pair of punches individual to the die, and which enter the die from opposite ends, one of the punches being subsequently withdrawn from the die and the other punch being pushed through the die to eject the tablet from the die. A tabletting machine of the kind described usually employs individual stationary cams to operate the punches which rotate with the die table to engage the cams at set stations. This creates noise and wear problems, which increase with the speed of operation, due to the punches striking the cams.

Any proposal to provide a continuous cam track to operate the punches, in order to avoid this problem, has preferably to include means for adjusting the cam track to control the dose of powdered material which is compressed in order to form each tablet and preferably also, the thickness of the resulting tablet.

The dose of powdered material which is compressed in order to form each tablet is conventionally determined by an individual, so called, "weight adjustment" cam which predeterminedly positions one of the punches in each die at the die filling station. This provides a variable volume measure of the powder to fill the die, since the die is always filled with powder to the level of the surface of the die table. By altering the position of the "weight adjustment" cam therefore, the volume of the powder and therefore the weight of the tablet, can be adjusted.

The thickness of the tablet is conventionally determined by the position of a "compression roller" cam which advances one of the punches in the die to compress the powder against the other punch and thereby form the tablet. The thickness of the resulting tablet depends inter alia upon how far this punch is advanced by the compression roller. Another factor is the time interval during which the compression is applied.

By altering the position of the compression roller cam, the thickness of the tablet can be adjusted.

One object of the present invention is to provide a continuous camming arrangement for punches in a tabletting machine of the kind described which is readily adjustable to adjust the weight and preferably also the thickness of the tablets produced in the machine.

SUMMARY OF THE INVENTION

According to the present invention, there is provided, in one aspect, a tabletting machine of the kind described in which the punches are moved relative to the die table radially with respect to the axis of rotation of the die table, and corresponding ones of each pair of punches are moved under the control of radial deflections of a flexible hoop which rotates with the die table and which is constrained and guided by abutments so as to assume a non-circular shape, one at least of the abutments being adjustable radially with respect to the axis of rotation of the die table thereby to adjust the movement of said corresponding ones of said punches.

Preferably the hoop rotates with the die table in contact with the heads of said corresponding ones of said punches.

Preferably also, said corresponding ones of said punches are the radially outer ones of each pair of punches.

The abutments may comprise rolling means which roll in contact with the hoop, and preferably, such rolling means are freely rotatable so as to be driven only by contact with said flexible hoop.

Conveniently, said corresponding ones of said punches are moved under the control of said flexible hoop to eject the tablets from the dies.

Also, two of the abutments may be adjustable radially with respect to the axis of rotation of the die table, one to adjust the weight of the tablets and the other to adjust the thickness of the tablets produced in the machine.

Where not more than three of said abutments are provided, the other punch of each pair of punches may be moved by a circular cam track eccentrically disposed with respect to the axis of rotation of the die table.

A further object of the present invention is to provide a tabletting machine of the kind described having an improved feeding arrangement for feeding powder or granulated material to be tabletted from the surface of the die table into the dies.

Thus according to a further aspect of this invention, there is provided a tabletting machine of the kind described comprising a die table presenting a concave cylindrical surface to receive the powdered or granulated material from the feed frame.

With this arrangement the powdered or granulated material moves from the surface of the die table into the dies with the assistance of centrifugal force to provide for centrifugally assisted feeding of the material into the dies.

Preferably, the feed frame is arranged to feed the powdered or granulated material to be tabletted onto the surface of the die table to one side of the dies, to be carried round with the die table, stationary deflector means being provided to move such powdered or granulated material being carried round with the die table inside the feed frame, relative to the die table, over the dies to fill them.

BRIEF DESCRIPTION OF THE DRAWINGS

Specific embodiments of the present invention embracing both the hereinbefore described aspect of the invention will now be described by way of example and not by way of limitation, with reference to the accompanying drawings in which.

DETAILED DESCRIPTION OF ILLUSTRATED EMBODIMENTS

Figure 1:
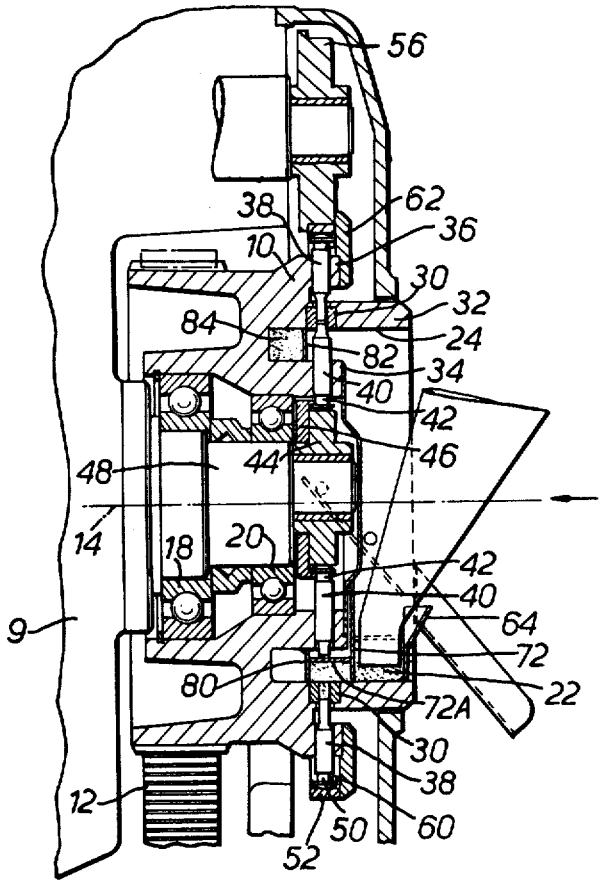
FIG. 1 is a cross-section in a plane through the axis of rotation of a rotating turret of a machine according to the invention taken on line 1—1 in FIG. 2 and showing the die table, opposite pairs of punches, an opposite pair of dies associated with the punches, camming arrangements for operating the punches, the powder feeding arrangements and a tablet take-off arrangement.

Referring to the accompanying drawings, the machine comprises a base cabinet 9 housing an infinitely variable speed motor connected to drive the turret 10 via a single stage reduction drive 12. The turret 10 is mounted on the cabinet for rotation, about a horizontal axis 14, by means of bearings 18 and 20. The turret is a body of revolution about its axis 14 and has the cross-sectional shape indicated in FIG. 1. Powdered or granulated material to be tabletted is fed from a feed frame generally indicated at 22, to a concave cylindrical surface 24 of a die table so as to fill the dies 30 which open at one end generally in the surface 24. Thus the die table is formed by the inner surface of an annular flange portion 32 of the turret 10. Two further annular flange portions 34 and 36 of the turret 10 have radial bores which guide the punches, two diametrically opposite pairs of which are generally indicated at 38. Thus the pairs of punches 38 are arranged with their long axes disposed radially with respect to the axis 14 in a common plane normal to the axis 14, the radially inner punches 40 sliding in the bores in the flange portion 34 and the radially outer punches sliding in the bores in the flange portion 36.

The heads 42 of the radially inner punches engage in a circular cam track formed between two freely rotatable, concentric circular parts 44 and 46 mounted on the cabinet, the concentric axes 48 of which are parallel to but offset from the axis 14.

Figure 2:
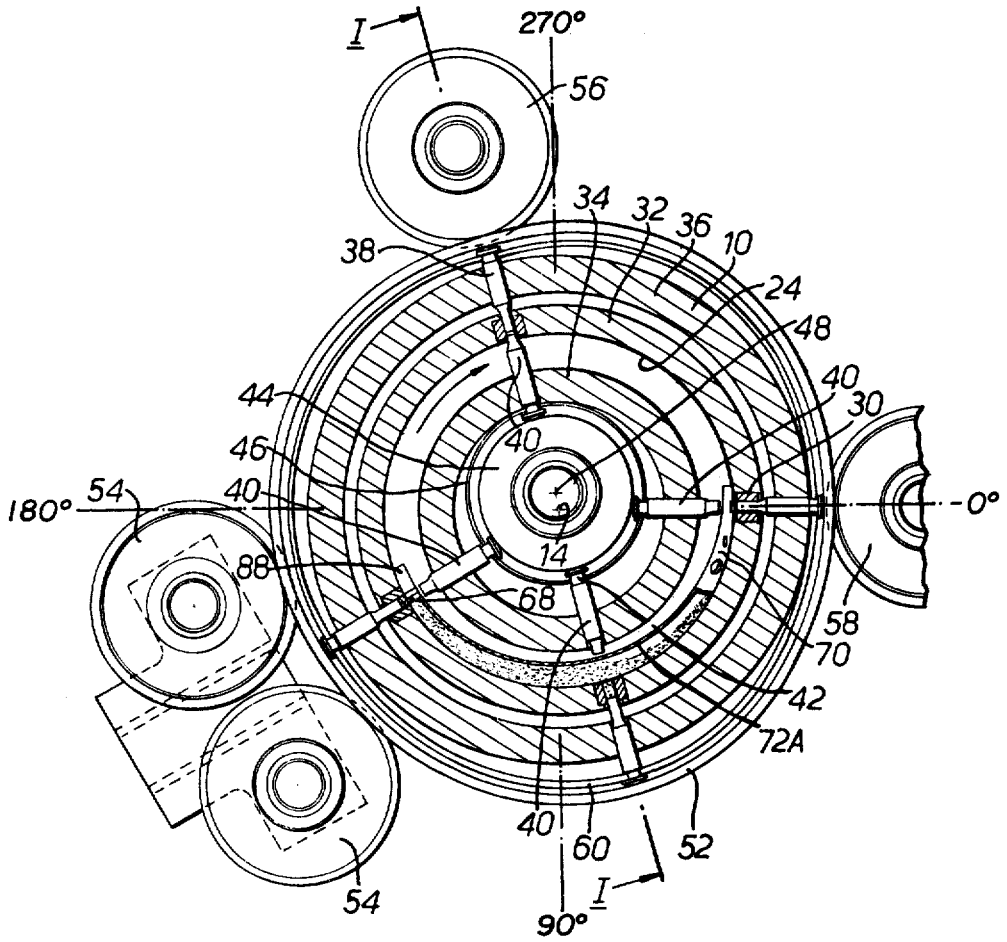
FIG. 2 is a cross-section in the radial plane containing the long axes of the punches but showing the punches and the camming arrangements in elevation in the direction of arrow 2 in FIG. 1.

The heads 50 of the radially outer punches are in engagement with an encircling hoop 52 in the form of a flexible band of suitable material e.g. steel or bronze or again a plastics material which rotates with the die table about its own centre and which is constrained and guided by three abutments comprising respectively a pair of cylindrical rollers, 54, and single cylindrical rollers 56 and 58, so as to assume a non-circular, tri-lobe shape as seen in FIG. 2. The rollers 54, 56 and 58 are each mounted on the cabinet for rotation about fixed axes co-incident with their cylindrical axes and parallel with the axis 14. The punch heads 50 are held in engagement with the hoop 52 by a spring wire ring 60 which engages the underside of these punch heads and is confined between them and a retaining plate 62 which is bolted to and is carried round with the turret 10.

The rollers 54, 56 and 58 roll in contact with the hoop 52 and two of the abutments formed by the pair of rollers, namely the roller 54 and the single roller 56, are adjustable towards and away from the axis 14, the rollers 54 to adjust the weight of the tablets to be formed in the dies 30 and the roller 56 to adjust the thickness of the tablets. An overload spring (not shown) is provided to limit the pressure which can be exerted on a tablet by the roller 56.

A vertically adjustable powder hopper 60 feeds powder (or granules) into the feed frame 22, to one side of the ring of dies 30 (see particularly FIG. 3) where the neck of the powder hopper is indicated at 63, onto the surface 24 of the die table.

The feed frame 22 is composed of a number of vertical walls which at their lower edges have a radial clearance with respect to the surface 24, and a roofing wall. Thus there is an outer wall 64 having an intermediate portion 66 extending parallel with the ring of dies, and two end portions 68 and 70 extending towards and across te ring of dies, an intermediate wall 72 extending parallel with the wall portion 66 and on the same side of the ring of dies as that portion, which forms with the wall 64 a compartment 74 in the feed frame which receives the neck 63 of the powder hopper. The compartment 74 is open at one end, as at 76, between one vertical edge of the wall 72 and the portion 68 of the wall 64. The feed frame further comprises two inner walls 78 and 80 disposed on the opposite side of the ring of dies and which co-operate with the wall 72 to constrain powder to move in the feed frame with the die table on the surface 24 thereof, and in a region over the dies. The roofing wall 72A extends between the walls 72 and 80 in confronting relation to the surface 24. The wall 72A is arcuate in form and is centred in the axis 48, whereby the height of the roofing wall above the surface 24 diminishes but the tips of the inner punches maintain a constant clearance with the wall as they pass over it.

Figure 3:
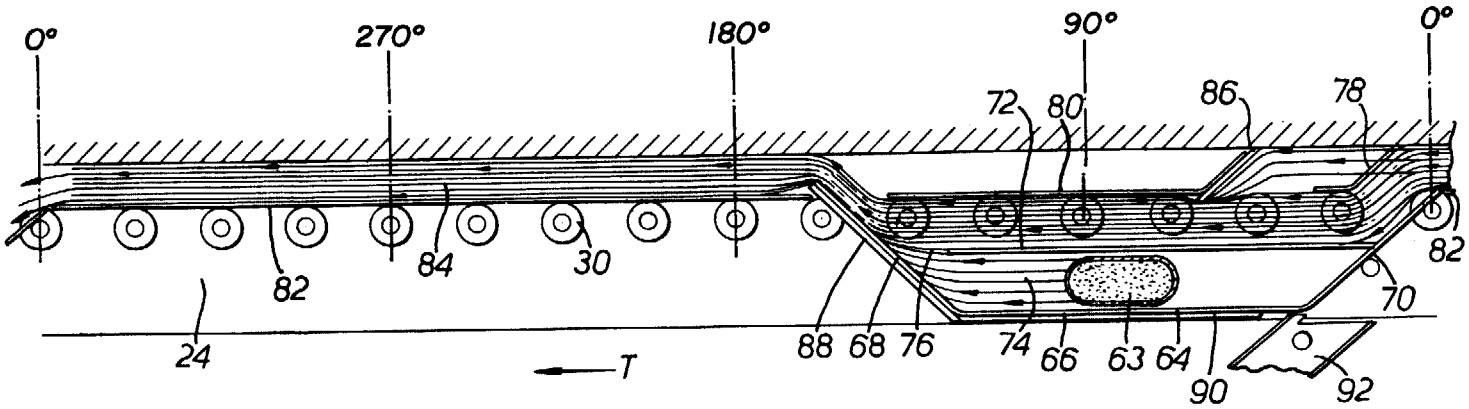
FIG. 3 is a diagrammatic developed view of the die table showing details of the powder feeding arrangements with a direction of turret rotation indicated by the arrow T.

The feed frame 22 occupies 160° of the circular arc circumscribed by the surface 24 as indicated on the angular scale marked along the top of FIG. 3 in 10° increments. Extending between the two ends of the feed frame, and so as to encompass the remainder of this arc, is a stationary part circular powder retaining band 82 which acts to retain surplus powder from the feed frame in a channel 84 formed in the turret between the flange portion 34 and the turret 10. Powder in the channel 84 rotates with the turret and is then held against the surface 14 of the die table by the action of centrifugal force. On entering the feed frame 22 this powder is deflected by the wall 78 so as to move over the dies to fill them. Any powder travelling under the lower edge of the wall 78 is likewise deflected by a sealing strip or scraper 86 on the wall 80 which makes contact at its lower edge with the surface 24.

Powder is confined in the feed frame by further sealing strips or scrapers 90 and 88 which also make contact at their lower edge with the surface 24.

The wall portion 68 and scraper 88 deflect excess powder back into the channel 84 as the powder leaves the feed frame. Deficiencies in the main powder stream re-entering the channel 84, due to dies having been filled, are made up by powder from the compartment 74 entering the stream through the gap 76 under the influence of the wall portion 68 and scraper 88.

The direction of movement of powder is clearly shown by the arrows in FIG. 3. The space in the compartment 74 behind the powder hopper neck 63 is free of powder. For this reason the sealing strip 90 extends only a short distance to the rear of the hopper neck.

An added function of the wall portion 70 is to act as a take off blade to guide tablets ejected from the dies into a stationary take-off chute 92.

In FIG. 2 angles are marked around the hoop 52 in correspondence with the angles marked along the top of FIG. 3.

The operation of the machine will now be described with respect to a tablet forming operation in one of the dies 30 and commencing from the 0° angle as marked. At this angle the tablet is ejected from the die by the outer punch. As the die moves through the feed frame the outer punch is partially withdrawn and powder is sucked into the die as well as being pressed into the die by the action of centrifugal force. Because the powder is moving through the feed frame during the filling step, the filling of the die with powder is still further facilitated and high speed operation therefore made possible.

As the outer punch approaches and traverses the weight adjustment rollers 54, the punch is advanced to eject surplus powder from the die, the "fill" of powder in the die being finally scraped flat with the surface of the die table as the die passes out of the feed frame under the scraper 88. Thus the radial adjustment of the rollers 54, which may take place while the machine is in motion, controls the "dose" of powder in the die (and in each subsequent die which traverses the rollers 54) and therefore the weight of the tablet.

During the passage through the feed frame, the powder is contained, and pressed towards the dies, by the roofing wall 72A which comprises a wedging action on the powder and also prevents the powder contaminating the tips of the inner punches 40.

After traversing the rollers 54, the outer punch is again partially withdrawn to prevent any spillage of the measured dose out of the die during entry of the inner punch into the die to compress the powder and form the tablet.

The inner punch is advanced to enter the die by the cam track 44, 46 as the die approaches and traverses the compression roller 56, as does the outer punch, and the point of maximum compression is reached as the outer punch traverses the roller 56. Thus the radial adjustment of the roller 56, which may take place while the machine is in motion, controls the thickness of the tablet which is formed.

After traversing the roller 56 the outer punch is again partially withdrawn but the tablet maintains its position in the die. The inner punch is completely withdrawn from the die by the cam track 44, 46.

As the outer punch approaches and traverses the ejection roller the outer punch is advanced sufficiently to push the tablet right out of the die, as the punch traverses the ejection roller and the tablet is guided by the take-off chute.

The ejection roller may have a fixed position.

The rollers 54, 56 and 58 are freely rotatable and are driven only by contact with the hoop 52.

The radial deflections of the hoop 52 control the movements of the outer punches as the turret rotates. Since the hoop is constrained by the rollers to assume a non-circular trilobe shape, each outer punch is withdrawn and advanced three times over in each tablet forming rotation of the turret. This movement, which is a compromise in as far as it is really unnecessary to withdraw the punch after forming a tablet before again advancing the punch to eject the tablet, nevertheless allows the outer punches to be controlled by a continuous camming arrangement which is adjustable to alter both the weight and thickness of the tablets and this while the machine is in use. The speed of the machine can accordingly be increased without creating any significant noise or wear problems and, in this respect also, the centrifugal feeding of powder to the dies coupled with the feature of filling the dies from a stream of powder moving with the dies, assists.

To ensure accurate metering of each dose it is preferable that the outer punch changes its direction of travel precisely at the weight adjusting station, i.e. the tip of the punch must be at a minimum radial distance from the turret axis 14 as it passes beneath the scraper 88.

To fufil this requirement the shape of the hoop 52 must be controlled in a manner such that a line tangent to it at the weight adjusting station is always at right angles to the radial line from the turret axis.

This is achieved, in the specific embodiment which has been described, by providing two identical rollers 54 equally spaced about the weight adjusting point and mounted on a common, radially adjustable slide thus ensuring that the rollers 54 are always at an equal radial distance from the turret axis 14 in all positions of adjustment.

As will be appreciated, it is essentially necessary merely to withdraw each outer punch for die filling and then advance it in three increments, (a) for depth of fill (to determine the weight of the tablet to be formed) (b) to compress the fill material predeterminedly, thereby to arrive at a tablet of predetermined thickness, and (c) to eject the tablet from the die.

After the measuring step (a), it is of some practical advantage, but not essential, that each outer punch be withdrawn before again advancing to compress the fill material, because this helps to prevent any spillage of the measured dose of fill material from the die, but it is a disadvantage if the punch is withdrawn too far at this stage because air may then become trapped in the die during the compression step.

Bearing in mind the essential outer punch movements, it is conceivable, in accordance with the present invention, to use a flexible hoop which is constrained and guided by abutments so as to assume a non circular, two lobe shape to control the movement of the outer punches.

Where, in this case, more than one abutment is adjustable radially with respect to the axis of rotation of the die table, to adjust the movement of the outer punches to set the machine to produce tablets of both different weight and different thickness, some limitation of the range of adjustment for a given flexible hoop diameter may be necessary, but this is not unacceptable since, in the final event many tabletting machines are continuously run on one product and adjustments are required only to correct the weight and the thickness of the product without necessarily altering them within any wide range.

Whilst a machine has been described in which one tablet only is produced in each die for each rotation of the turret, it is equally possible to design a machine according to the present invention so that more than one tablet is produced in each die for each revolution of the turret.

In order to produce two tablets in each die, per revolution of the turret, the machine as described can be modified by the provision of six abutments to constrain and guide the flexible hoop for rotation about the axis of rotation of the turret, so that it assumes a six lobed shape. Radially adjustable abutments would permit weight and thickness adjustments for each tablet formed in each half of each revolution. Instead of a simple eccentric roller operating the inner punches, the inner punches would be operated by a double eccentric, in this case formed, for example, by a flexible band passing around two rollers.

Two tablets per die, per revolution, may also be produced in a machine according to this invention employing four abutments constraining and guiding a flexible hoop for rotation about the axis of rotation of the turret, so that it assumes a four lobed shape.

A conventional tabletting machine of the kind described has a flat horizontally disposed die table. On such a conventional tabletting machine centrifugal force acts at right angles to the axis of the dies, resulting in tablets of uneven density when high speeds are used;

i.e. the material is packed towards the outer wall of the die.

On the machine according to the present invention, as described and shown, centrifugal force acts along the axis of the die and therefore produces tablets of uniform density irrespective of rotational speed. On the conventional tabletting machine the die is filled by the combined effects of a descending lower punch and gravity, which remains constant irrespective of rotational speed. On the machine according to the present invention, as described and shown, the die is filled by the combined effects of the descending outer punch and centrifugal force which increases with rotational speed. On the conventional tabletting machine rotational speed is limited by the maximum peripheral speed at which the punch heads can be successfully traversed over the fixed cam tracks considering the high pressures involved and the difficulties of lubrication. Wear on tooling and cams must be kept to an acceptable level and over lubrication invariably results in contamination of the product. On the machine according to the present invention as described and shown, both inner and outer cam tracks rotate with the turret and very little relative movement takes place between the punch heads and the tracks. Wear on punch heads and cam tracks is virtually eliminated and lubrication problems are reduced to a minimum.

On the conventional tabletting machine the necessity of providing vertical adjustment to certain sections of the lower cam track means that the track rarely approaches an ideal shape. Steps have to be taken therefore to prevent loss of contact between the punch heads and the lower cam track (so called punch flight) at the critical points such as the weight adjustment sector.

On the machine according to the present invention as described and shown, the flexible outer cam track assumes an optimum shape at all degrees of adjustment and the outer punch heads remain in contact with it at all times. The conventional tabletting machine is inherently noisy due to the fact that the fixed cam tracks are formed from segments which are contacted intermittently by the punch heads which are travelling at a considerable relative speed. On the machine according to the present invention as described and shown, noise is reduced to a minimum as punch heads maintain unbroken contact with the cam tracks and relative movement is small. On the conventional tabletting machine precompression rollers are sometimes employed in an attempt to release entrapped air from the material before compression. On the machine according to the present invention as described and shown, the precompression function is performed by centrifugal force which compacts the fill prior to the entry of the inner punch. After entry the inner and outer punches approach one another over a relatively long arc allowing ample time for the release of air trapped between the already compacted fill and the inner punch. On the conventional tabletting machine the previously mentioned limitations on turret speed dictate that a multi-stage reduction be employed in the drive to the turret. On the machine according to the present invention as described and shown, the higher turret speed permits the use of a single stage reduction drive from a variable speed motor. On the conventional tabletting machine considerable stripping down is required to gain access to some of the working parts (e.g. main turret bearings) making maintenance and cleaning major operations. On the machine according to the present invention as described and shown, removal of a single cover gives immediate access to all working parts and the complete turret may be very readily removed.

While the axis of rotation of the turret has been described as extending horizontally, this axis of rotation could extend vertically, or at some intermediate angle. Also, the machine may be made double sided with a turret on each side, the turrets being rotated in common, on a common axis of rotation, and both turrets being served by common tablet weight and thickness adjustment controls.

We claim:

1. In a tabletting machine in which the powdered or granulated material to be tabletted is fed from a feed frame onto the surface of a rotating die table so as to fill dies in the die table and be compressed into a tablet in each die, between a pair of punches individual to the die, and which enter the die from opposite ends, one of the punches being subsequently withdrawn from the die and the other punch being pushed through the die to eject the tablet from the die, [the improvement wherein:] *and in which*

[a.] the punches are arranged for movement relative to the die table, radially with respect to the axis of the die table, *the improvement comprising:*

[b.] a flexible hoop [is provided] which rotates with the die table and which is constrained and guided by abutments so as to assume a non-circular shape, and

[c.] means [is provided] *coupled to said punches* for moving corresponding ones of each pair of punches under the control of radial deflections of said flexible hoop, one at least of said abutments being adjustable radially with respect to the axis of rotation of the die table thereby to adjust the movement of said corresponding ones of said punches.

2. A tabletting machine as claimed in claim 1 in which the hoop rotates with the die table in contact with the heads of said corresponding ones of said punches.

3. A tabletting machine as claimed in claim 1 in which said corresponding ones of said punches are the radially outer one of each pair of punches.

4. A tabletting machine as claimed in claim 3 in which the heads of the radially outer ones of each pair of punches are held in engagement with the hoop by a spring wire ring engaging the underside of the heads, the ring being confined between the punch heads and a retaining plate carried round with the die table.

5. A tabletting machine as claimed in claim 1 in which the abutments comprise rolling means which roll in contact with the hoop.

6. A tabletting machine as claimed in claim 5 in which the rolling means are freely rotatable, so as to be driven only by contact with said flexible hoop.

7. A tabletting machine as claimed in claim 1 in which said corresponding ones of said punches are moved under the control of said flexible hoop to eject the tablets from the dies.

8. A tabletting machine as claimed in claim 7 in which two of the abutments are adjustable radially with respect to the axis of rotation of the die table, one to adjust the weight of the tablets and the other to adjust the thickness of the tablets produced in the machine.

9. A tabletting machine as claimed in claim 8 in which the abutment for adjusting the weight of the tablets comprises a pair of rollers of equal diameter and having their axes parallel to, and equi-spaced from, the axis of rotation of the die table in all positions of their adjustment.

10. A tabletting machine as claimed in claim 8 comprising not more than three of said abutments, and which includes a circular cam track eccentrically disposed with respect to the axis of rotation of the die table the other punch of each pair being moved by said circular cam track.

11. A tabletting machine as claimed in claim 10 in which the heads of said other punches engage in said circular cam track.

12. A tabletting machine as claimed in claim 10 in which the circular cam track is formed between two freely rotatable, concentric, circular parts.

13. A tabletting machine as claimed in claim 1 in which the axis of rotation of the die table is disposed at an angle to the vertical.

14. A tabletting machine as claimed in claim 13 in which the axis of rotation of the die table is disposed horizontally.

15. A tabletting machine as claimed in claim 1 in which the die table presents a concave cylindrical surface to receive the powdered or granulated material from the feed frame.

16. A tabletting machine as claimed in claim 15 in which the feed frame is arranged to feed the powdered or granulated material to be tabletted onto the surface of the die table, to one side of the dies, to be carried round with the die table, stationary deflector means being provided to move such powdered or granulated material being carried round with the die table inside the feed frame, relative to the die table, over the dies to fill them.

17. A tabletting machine as claimed in claim 16 in which stationary deflector means is provided to move excess powdered or granulated material deflected by said first said stationary deflector means and being carried round with said die table, inside the feed frame relative to the die table, to the other side of said dies, the excess material then leaving the feed frame and entering a part annular channel defined in part by the surface of the die table and in part by a stationary part circular powder retaining band, a still further stationary deflector means being provided for move powdered or granulated material carried round in said channel and re-entering the feed frame, back over the dies to fill them.

18. A tabletting machine as claimed in claim [16] *17* in which the feed frame comprises an outer wall, an intermediate wall and an inner wall, the inner wall having a wall portion disposed generally in the plane of said powder retaining band, and on said other side of said dies, the intermediate wall being disposed on said one side of said dies and the outer wall having a portion disposed on the side of said intermediate wall remote from the dies, and a hopper for powdered or granulated material to be tabletted is arranged to supply fill material onto the surface of the die table between said outer wall portion and said intermediate wall, such material being deflected passed one end of said intermediate wall by said first said stationary deflector means and excess fill material being deflected passed one end of said inner wall by said second said stationary deflector means, said still further stationary deflector means deflecting surplus fill material re-entering the feed frame into the space between said inner wall portion and said intermediate wall.

19. A tabletting machine comprising a rotatable die table presenting a concave cylindrical surface, a stationary feed frame for feeding powdered or granulated material to be tabletted onto said surface, *to be carried around with the die table, a part annular channel being defined in part by the surface of the die table and in part by a stationary part circular powder retaining band for receiving excess powdered or granulated material from one end of the feed frame and for conducting excess material round, on the die table, to re-enter the feed frame at its opposite end,* a ring of dies in the die table, the dies opening[,] at one end[,] in said surface *in positions to move through the feed frame* to receive powdered or granulated material fed onto said surface by said frame[,] *and moving with said surface, whereby the action of centrifugal force generated by rotation of the die table on the powdered or granulated material feeds the material into the dies* and for each die, a pair of punches individual to the die and rotatable with the die table, means for entering the punches into the die, from opposite ends of the die, thereby to compress powdered or granulated material in the die and form a tablet, and means for subsequently withdrawing one of the punches from the die and for advancing the other punch to eject the tablet from the die.

* * * * *